(12) United States Patent
Cannon et al.

(10) Patent No.: US 8,811,460 B2
(45) Date of Patent: *Aug. 19, 2014

(54) BURST PROCESSING MODEM

(75) Inventors: Richard Hollingsworth Cannon, Mesa, AZ (US); John Scott Crockett, Maricopa, AZ (US); Cris M. Mamaril, Mesa, AZ (US); Mark Dale, Scottsdale, AZ (US)

(73) Assignee: Comtech EF Data Corp., Tempe, AZ (US)

( * ) Notice: Subject to any disclaimer, the term of this patent is extended or adjusted under 35 U.S.C. 154(b) by 365 days.

This patent is subject to a terminal disclaimer.

(21) Appl. No.: 13/363,254

(22) Filed: Jan. 31, 2012

(65) Prior Publication Data

US 2012/0128047 A1     May 24, 2012

Related U.S. Application Data

(63) Continuation of application No. 12/640,887, filed on Dec. 17, 2009, now Pat. No. 8,107,515.

(60) Provisional application No. 61/138,196, filed on Dec. 17, 2008.

(51) Int. Cl.
*H04B 1/38* (2006.01)
*H04L 5/16* (2006.01)
*H04L 1/00* (2006.01)

(52) U.S. Cl.
CPC ............. *H04L 1/0071* (2013.01); *H04L 1/0045* (2013.01)
USPC ........... 375/222; 375/219; 375/220; 375/260; 375/261; 375/223; 455/509; 455/553.1; 370/431; 370/480; 370/464

(58) Field of Classification Search
CPC ............ H04B 1/40; H04B 3/23; H04B 1/406; H04B 1/005; H04B 1/0057; H04L 27/2601; H04L 1/0025; H04L 25/0266; H04L 7/033; H04L 25/06; H04L 5/023; H04L 25/4927; H04L 5/1438; H04L 27/2608; H04L 27/10; H04L 27/2273; H04L 27/2071; H04L 27/2647; H04L 5/0007; H04L 27/2657; H04L 27/2662; H04L 5/0048; H04L 27/38; H04L 27/34; H04L 27/3488; H04L 1/0041; H04L 1/0071; H04L 29/06; H04L 12/2801; H04L 12/403; H04L 29/06027; H04L 1/0003; H04L 5/06; H04L 27/2602; H04M 11/06; H04M 11/062; H04W 84/08; H04W 28/04; H04W 88/08; H04W 72/044; H04W 72/042; H04W 88/06; H04W 88/02
USPC ................. 375/222, 219, 220, 260, 261, 223; 455/509, 553.1; 370/431, 480, 464
See application file for complete search history.

(56) References Cited

U.S. PATENT DOCUMENTS 6,898,235 B1 * 5/2005 Carlin et al. ................... 375/219
6,952,408 B2 * 10/2005 Schwaller et al. ............ 370/314

(Continued)

*Primary Examiner* — Phuong Phu
(74) *Attorney, Agent, or Firm* — Booth Udall Fuller, PLC

(57) ABSTRACT

A burst processing modem. Implementations may include a receive side including a channelizer adapted to process a plurality of channels and write a plurality of frames to a receive RAM array. A receive frame state machine may be adapted to generate a timing signal using a burst time plan for the plurality of frames. A demodulator may be coupled with the receive RAM array and adapted to read from the receive RAM array only the one or more bursts from the plurality of frames indicated by the timing signal. A transmit side may include a modulator coupled with a transmit frame state machine, with a transmit RAM array, and a combiner bank. The combiner bank may read the modulated plurality of channels from the transmit RAM array and assemble a plurality of frames using a timing signal generated from a burst time plan by the transmit frame state machine.

22 Claims, 14 Drawing Sheets

(56) References Cited

U.S. PATENT DOCUMENTS 8,107,515 B2 * 1/2012 Cannon et al. ................ 375/222
8,238,362 B2 * 8/2012 Cannon et al. ................ 370/464

* cited by examiner

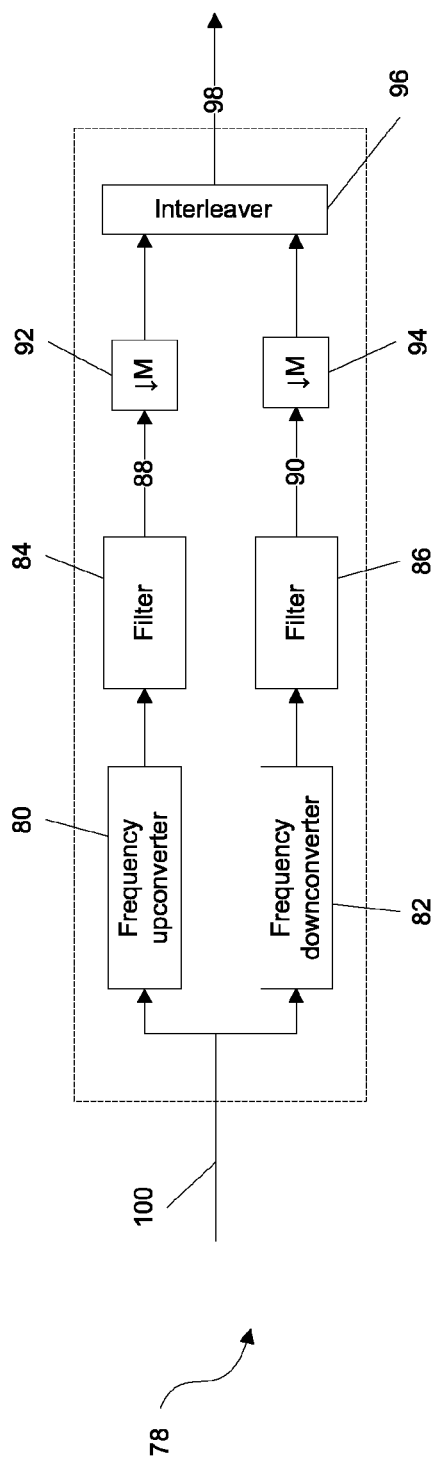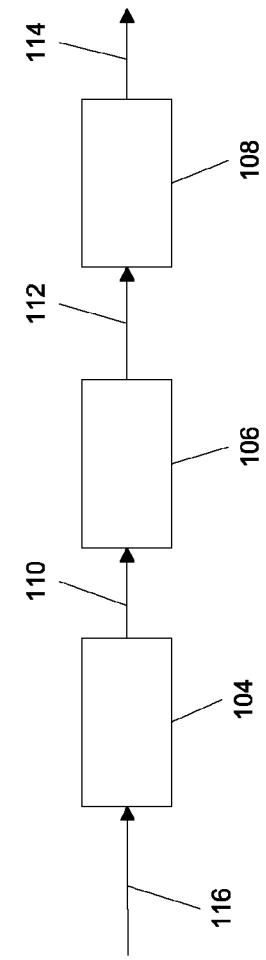

BURST PROCESSING MODEM

CROSS REFERENCE TO RELATED APPLICATIONS

This application is a continuation of the earlier patent application entitled "BURST PROCESSING MODEM," Ser. No. 12/640,887 to Cannon et al., filed Dec. 17, 2009 now U.S. Pat. No. 8,107,515, which claims the benefit of priority to U.S. provisional application Ser. No. 61/138,196 to Cannon et al., entitled "Multi-Beam, Multi-Channel Burst Processing Modem," filed Dec. 17, 2008, the disclosures of which are hereby incorporated herein by reference.

BACKGROUND

1. Technical Field

Aspects of this document relate generally to systems and methods for transmitting data across a telecommunication channel.

2. Background Art

A wide variety of systems and methods have been devised to allow for the transmission of data information across a telecommunication channel. Generally, such systems include modulators that encode the data in a format that allows it to be transported into the telecommunication channel and demodulators that receive the transported data from the channel and recover the encoded data. The word "modem" is derived from the combination of modulator and demodulator, indicating the paired relationship and function of these components that exists in many data transmission systems. An example of a modulator and demodulator includes a telephone, which receives voice information and modulates it into a signal which is used to modulate a carrier wave signal which is transported by a wire or optical path.

SUMMARY

Implementations of a burst processing modem may include a receive side that includes a channelizer including one or more stages coupled with a random access memory (RAM) array. The channelizer may be adapted to process a plurality of channels included in a plurality of intermediate frequency (IF) received beams and to write a plurality of frames included in each of the plurality of channels to the RAM array where each of the plurality of frames includes one or more bursts. A receive frame state machine may be coupled with the RAM array and with the channelizer and may be adapted to generate a timing signal using a burst time plan for the plurality of frames included in each of the plurality of channels. A demodulator may be coupled with the receive frame state machine and with the RAM array and may be adapted to read from the RAM array only the one or more bursts from the plurality of frames indicated by the timing signal, demodulate the one or more bursts, and transmit the one or more bursts to a decoding module.

Implementations of a burst processing modem including a receive side may include one, all, or any of the following:

The modem may further include an IF block adapted to receive and to filter the plurality of IF received beam signals. The IF block may include a plurality of automatic gain control (AGC) amplifiers coupled with a plurality of filters adapted to generate a filtered plurality of IF received beam signals. An analog-to-digital converter (ADC) may be included and coupled with the plurality of filters and to the channelizer. The ADC may be adapted to convert the filtered plurality of IF received beam signals to a plurality of channels.

The demodulator may be a single demodulator, the channelizer may be a first channelizer, and the RAM array may be a first RAM array. The modem may further include second, third, and fourth channelizers coupled with second, third, and fourth RAM arrays, respectively, all of which are coupled with the single demodulator. The single demodulator may be adapted to demodulate the one or more bursts form the plurality of frames included in each of the plurality of channels where the plurality of channels are from any of sixteen IF received beams.

Each of the one or more stages in the channelizer may include a frequency upconverter coupled with a first filter and an interleaver and a frequency downconverter coupled with a second filter and with the interleaver.

Each of the one or more stages may further include a first downsampler coupled with the first filter and with the interleaver and a second downsampler coupled with the second filter and with the interleaver.

Each of the one or more stages may further include a selector multiplexer coupled with an output of the interleaver and with an input to the frequency converter and to the frequency downconverter where the selector multiplexer may be adapted to output either the output of the interleaver or a copy of the input to the frequency upconverter and to the frequency downconverter in response to a control signal in the input to the frequency upconverter and to the frequency downconverter.

The one or more stages of the channelizer may include a polyphase filter bank including at each stage a downsampler coupled with a bandpass filter coupled with a discrete Fourier transform (DFT) module, wherein the downsampler, bandpass filter, and DFT module are adapted to separate a channel of the plurality of channels from one of the plurality of received IF beams and to write the channel to the RAM array.

The channelizer may include two or more polyphase filter banks where the bandpass filters in the stages of one of the two or more polyphase filter banks pass a first number of channels per stage and the bandpass filters in the stages of another of the two or more polyphase filter banks pass a second number of channels per stage where the second number is different than the first number.

Implementations of a burst processing modem may include a transmit side including a single modulator coupled with a transmit frame state machine and with two or more RAM arrays. The single modulator may be adapted to modulate a plurality of channels of a plurality of beams to be transmitted to form a modulated plurality of channels. The single modulator may also be adapted to write to a first one of the two or more RAM arrays a first portion of the modulated plurality of channels and to write to a second one of the two or more RAM arrays a second portion of the modulated plurality of channels. Two or more combiner banks including one or more stages may be included, each of the two or more combiner banks being coupled with one of the two or more RAM arrays, respectively. Each of the two or more combiner banks may be coupled with the transmit frame state machine. A first one of the two or more combiner banks may be adapted to read the first portion of the modulated plurality of channels from the first RAM array and to assemble a first plurality of frames each including one or more bursts using a timing signal generated from a burst time plan by the transmit frame state machine. A second one of the two or more combiner banks may be adapted to read the second portion of the modulated plurality of channels from the second RAM array and to assemble a second plurality of frames each including one or more bursts using a timing signal generated from the burst time plan by the transmit frame state machine.

Implementations of a burst processing modem having a transmit side may include one, all, or any of the following:

The modem may further include an IF block including a plurality of upsamplers coupled with the two or more combiner banks and adapted to upsample the first plurality of frames and the second plurality of frames to produce an upsampled first plurality of frames and an upsampled second plurality of frames. Two or more digital-to-analog converters (DAC) may be coupled with the plurality of upsamplers and may be adapted to receive the upsampled first plurality of frames and the upsampled second plurality of frames and to produce the plurality of channels for each of the plurality of beams to be transmitted.

The first one of the two or more combiner banks may be a first combiner bank and the second one of the two or more combiner banks may be a second combiner bank. The modem may further include third combiner banks and fourth combiner banks coupled with a third RAM array and with a fourth RAM array, respectively. The first, second, third, and fourth combiner banks may be coupled with an IF block where the first, second, third, and fourth combiner banks and the first, second, third, and fourth RAM arrays are adapted to modulate first, second, third, and fourth pluralities of frames to produce, in combination with the IF block, the plurality of channels for sixteen beams for transmission.

The one or more stages of the two or more combiner banks may each include a deinterleaver coupled with a first filter and with a second filter where the first filter is coupled with a frequency downconverter and the second filter is coupled with a frequency upconverter. An output of the frequency downconverter and an output of the frequency upconverter may be added to form a combined output.

The modem may further include a first upsampler coupled with the deinterleaver and with the first filter and a second upsampler coupled with the deinterleaver and with the second filter. A selector multiplexer may be coupled with the combined output and coupled with an input to the deinterleaver wherein the selector multiplexer is adapted to output either the combined output or a copy of the input to the deinterleaver in response to a control signal in the input to the deinterleaver.

The one or more stages of the two or more combiner banks may include a discrete Fourier transform (DFT) module coupled with a plurality of bandpass filters coupled with a plurality of upsamplers. An output of each of plurality of upsamplers may be added to form a digital beam signal for transmission.

A first one of the two or more combiner banks may include a plurality of bandpass filters that pass a first number of channels and a second one of the two or more combiner banks may contain a plurality of bandpass filters that pass a second number of channels where the first number is different that the second number.

Implementations of a burst processing modem may include a receive side including a receive IF processing array adapted to receive a plurality of IF beam signals and to filter and to digitize the plurality of IF beam signals to form a plurality of channels for each of the plurality of IF beam signals. A channelizer may be included that includes one or more stages coupled with the IF processing array and with a receive RAM array. The channelizer may be adapted to process the plurality of channels and to write a plurality of frames included in each of the plurality of channels to the receive RAM array, each of the plurality of frames including one or more bursts. A receive frame state machine may be coupled with the receive RAM array and with the channelizer and may be adapted to generate a timing signal using a burst time plan for the plurality of frames included in each of the plurality of channels. A demodulator may be coupled with the receive frame state machine and with the receive RAM array and may be adapted to read from the receive RAM array only the one or more bursts from the plurality of frames indicated by the timing signal and to demodulate the one or more bursts to form a demodulated one or more bursts. A decoding module may be coupled to the demodulator and may be adapted to receive the demodulated one or more bursts and to decode the demodulated one or more bursts to produce a plurality of packet data. A packet processing module may be coupled with the receive side and may be adapted to receive the plurality of packet data and to route the plurality of packet data. A transmit side may also be included and coupled with the packet processing module. The transmit side may include an encoder adapted to receive a quantity of packet data and to encode the quantity of packet data using an encoding format to form an encoded quantity of packet data. A modulator may be included and coupled with a transmit frame state machine and with a transmit RAM array. The modulator may be adapted to modulate the encoded quantity of packet data into a modulated plurality of channels of a plurality of beams for transmission and to write to the transmit RAM array the modulated plurality of channels. A combiner bank including one or more stages may be coupled with the transmit RAM array with the transmit frame state machine. The combiner bank may be adapted to read the modulated plurality of channels from the transmit RAM array and to assemble a plurality of frames each including one or more bursts using a timing signal generated from a burst time plan by the transmit frame state machine. A transmit IF array may be adapted to receive the plurality of frames from the combiner bank and to convert the plurality of frames to a plurality of IF beam signals.

Implementations of burst processing modems may include one, all, or any of the following:

The receive RAM array and the transmit RAM array may be the same physical RAM array.

Each of the one or more stages in the channelizer may include a frequency upconverter coupled with a first filter and with an interleaver and a frequency downconverter coupled with a second filter and with the interleaver.

The one or more stages of the channelizer may include a polyphase filter bank including at each stage a downsampler coupled with a bandpass filter coupled with a DFT module. The downsampler, bandpass filter, and DFT module may be adapted to separate a channel of the plurality of channels from one of the plurality of received IF beam signals and to write the channel to the RAM array.

The one or more stages of the combiner bank may each include a deinterleaver coupled with a first filter and with a second filter. The first filter may be coupled with a frequency downconverter and the second filter may be coupled with a frequency upconverter. An output of the frequency downconverter and an output of the frequency upconverter may be added to form a combined output.

The one or more stages of the combiner bank may include a DFT module coupled with a plurality of bandpass filters coupled with a plurality of upsamplers where an output of each of the plurality of upsamplers is added to form a digital beam signal for transmission.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 5 is a block diagram of a second implementation of a channelizer stage;

FIG. 6 is a block diagram of a second implementation of a channelizer;

DESCRIPTION

This disclosure, its aspects and implementations, are not limited to the specific components or assembly procedures disclosed herein. Many additional components and assembly procedures known in the art consistent with the intended burst processing modem and/or assembly procedures for a burst processing modem will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such burst processing modems and implementing components, consistent with the intended operation.

In satellite communication systems, particularly Time Division Multiple Access (TDMA) systems, a number of communication sites share access to the same satellite by transmitting to the satellite at specifically assigned short time intervals. The satellite receives the resulting bursts of data, demodulates the data, and forms a frame containing the data from the bursts ordered in time. The length of a burst and its location within the frame are specified in a burst time plan which all of the communication sites and the satellite use to ensure that the bursts are sent and the resulting frames processed properly. The frames are included in channels included in one or more beams used by the satellite in communicating with the communication sites. In particular implementations, a single beam can carry up to 240 channels and each channel can carry a plurality of frames. As used in this document, "channel" refers to a particular segment of a frequency bandwidth assigned to a particular beam. Accordingly, the channels of one beam do not overlap with the channels of any other beam. However, the actual signal received by a communication site from the satellite may be a wideband signal containing all or part of the possible channels associated with that beam. Because the data transported by the wideband signal is in burst form, the data is included as bursts within a plurality of frames within each channel of a plurality of channels within each beam of a plurality of beams.

Figure 1:
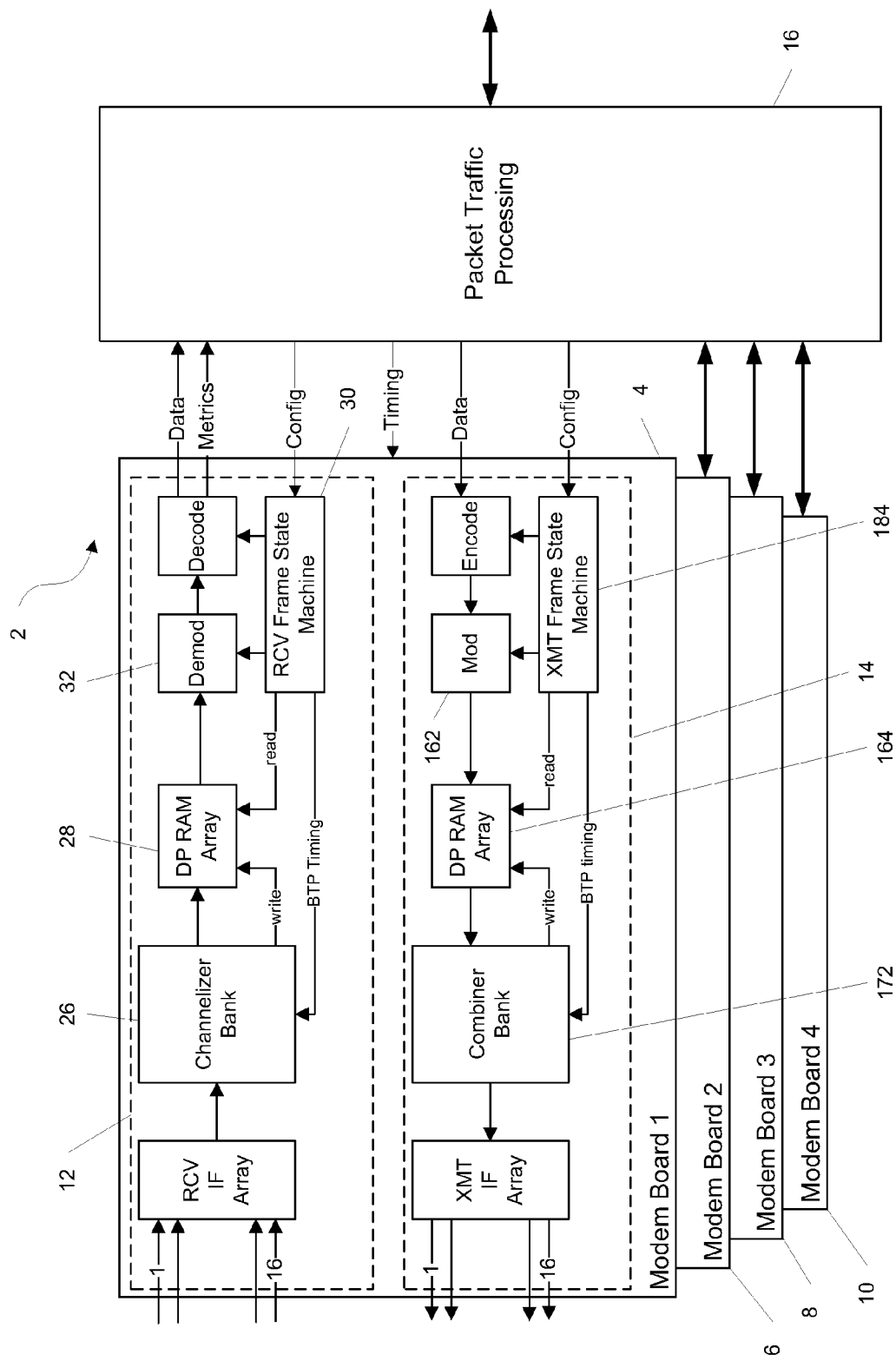
FIG. 1 is a block diagram view of an implementation of a burst processing modem.

In each communication site and satellite itself, a burst processing modem (a modulator and demodulator combination) is included to enable bidirectional communication. Referring to FIG. 1, an implementation of a burst processing modem system 2 is illustrated. As illustrated, the modem system 2 includes several modem boards 4, 6, 8, 10, on which a receive side 12 and a transmit side 14 are included. The receive side 12 and transmit side 14 are coupled together by a packet traffic processing module 16 which serves to route a wide variety of information including, by non-limiting example, data, configuration information, timing information, and performance metrics. While in the implementation illustrated in FIG. 1, the receive side 12 and transmit side 14 are on the same modem board 4, they could also be included in their own board in various implementations. In addition, in various implementations, the functions of the various components of the receive side 12 and the transmit side 14 may be implemented in discrete components or as functional blocks within a piece of executable code included in and/or operated by one or more field programmable gate arrays (FPGAs), application specific integrated circuits (ASICs), digital signal processors (DSPs), and/or as machine readable instructions executable by any type of microprocessor. Accordingly, in particular implementations of the system, no boards or discrete components may be used to form the structure, but the functions and structure of the implementations may be created by the coupling together of various microprocessor and/or memory storage devices and the executing of machine readable instructions that each implement the functions of the system.

Figure 2:
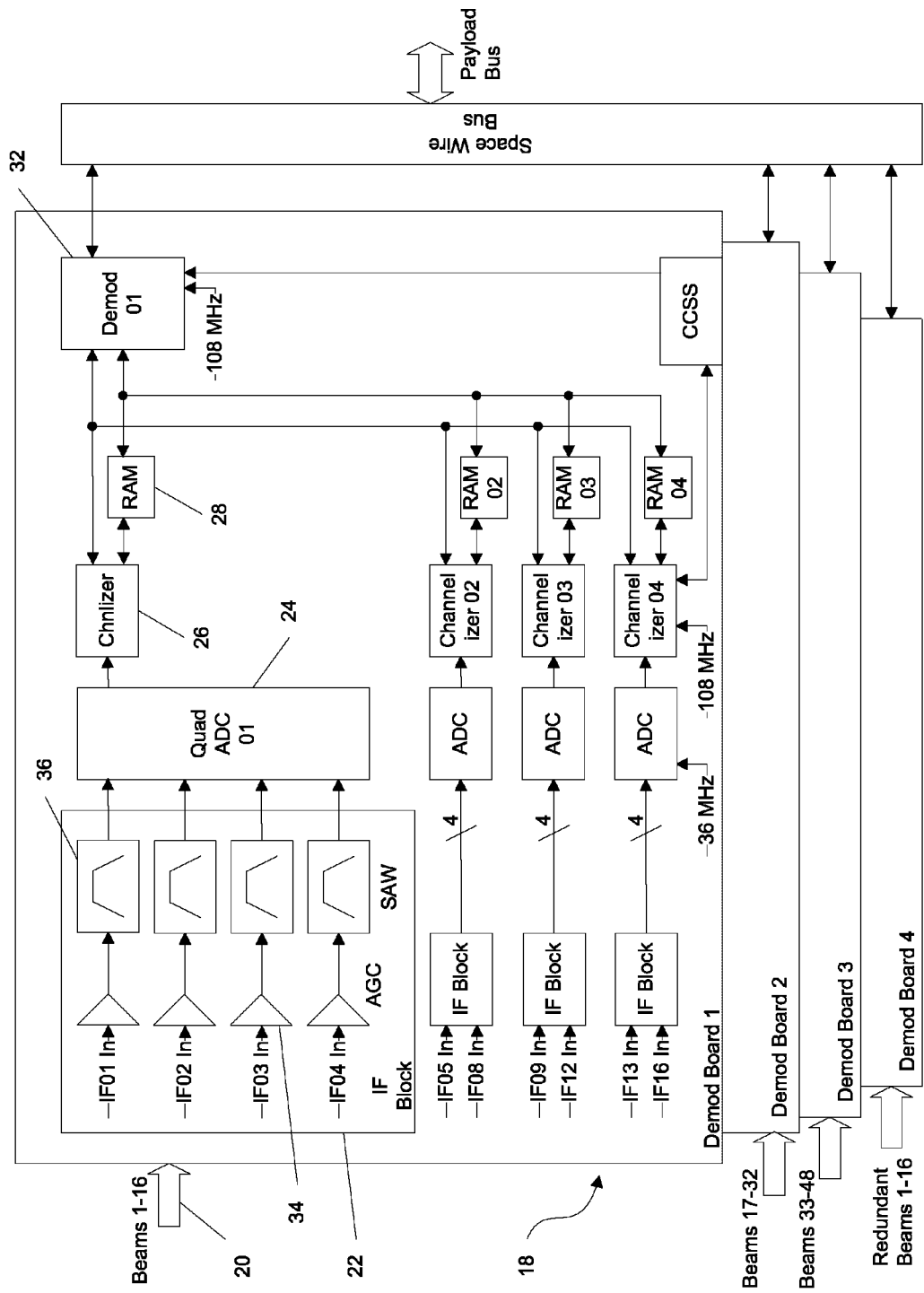
FIG. 2 is detail block view of a portion of the receive side of the burst processing modem implementation illustrated in FIG. 1.

Referring to FIG. 2, a detail view of a portion 18 of the receive side 12 is illustrated. A plurality of beams 20 enter as intermediate frequency (IF) received beams and are processed by an IF block 22 to form a filtered plurality of IF received beam signals. The filtered plurality of IF received beam signals is received by a quadruple analog-to-digital converter 24 (ADC) which simultaneously digitizes the IF received beam signal four beams at a time. The ADC outputs a plurality of channels for each beam (now digitized) to channelizer 26. Channelizer 26 separates the plurality of channels and writes each channel's data into random access memory (RAM) array 28, which may be a dual port RAM array in particular implementations. The use of dual port RAM allows the simultaneous access of information stored in different addresses in the RAM array on the same clock cycle. RAM arrays composed of dual port RAM may allow for the use of a single RAM array shared between the receive side 12 and the transmit side 14 in particular implementations. Referring to FIGS. 1 and 2, a receive frame state machine 30 is coupled to the RAM array 28 and to demodulator 32. The receive frame state machine 30 utilizes a burst time plan for each received frame, which includes information about where each burst is located within a particular frame of the plurality of frames within each channel of the plurality of channels within the received beam. The receive frame state machine 30 uses the burst time plan to create one or more timing signals that are sent to the channelizer 26 and/or demodulator 32. The demodulator 32 uses the one or more timing signals to know what memory addresses within the RAM array 28 contain desired burst data within a received frame in a particular channel thereby allowing the demodulator 32 to only process bursts within the frame that are desired. Because not all of the channels or even all of the frames include bursts needed by a particular communication site, not processing bursts, frames, or channels that are not relevant with the demodulator 32 serves to reduce system overhead and/or consumption of system resources.

By inspection, the implementation of a burst processing modem 2 illustrated in FIGS. 1 and 2 is configured to allow the processing of four beams per channelizer 26; accordingly, each receive side 12 includes first, second, third, and fourth channelizers and RAM arrays coupled together, respectively, all coupled to a single demodulator 32. The resulting system is capable of handling 16 beams per receive side 12. In addition, implementations of the IF block 22 include an automatic gain control (AGC) amplifier 34 and filter 36 (which may be a surface acoustic wave filter in particular implementations) to process each IF received beam prior to processing by the ADC 24.

Figure 3:
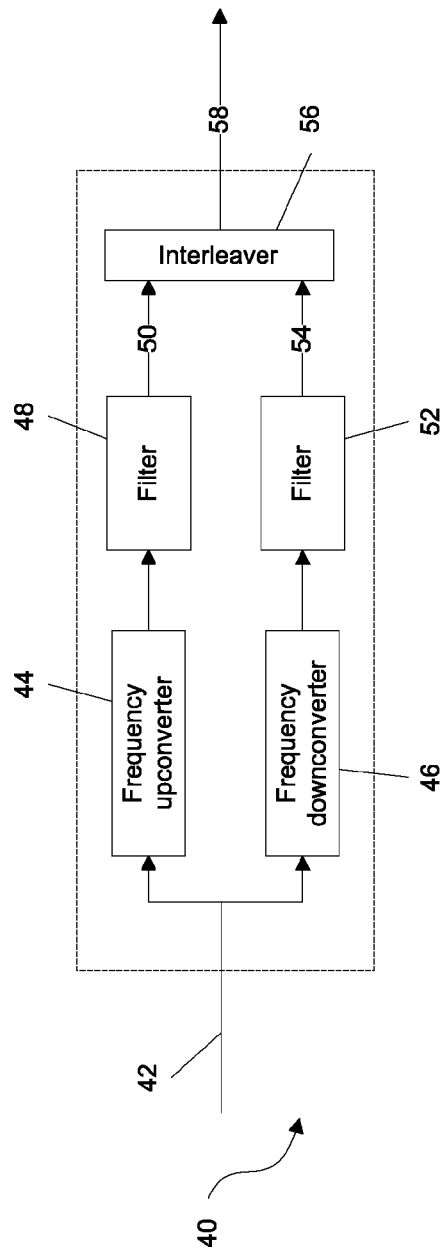
FIG. 3 is a block diagram of a first implementation of a channelizer stage.

Referring to FIG. 3, implementations of a channelizer 26 may take a number of forms, including channelizer implementations that are composed of one or more stages. In FIG. 3, an implementation of a first implementation of a channelizer stage 40 is illustrated. As illustrated, input 42 is divided and a portion is sent to frequency upconverter 44 and to frequency downconverter 46. Frequency upconverter 44 serves to center an upper portion of the bandwidth of the signal included in the input 42 over zero while frequency down converter 46 centers a lower portion of the bandwidth over zero. After passing through first filter 48 (which may be a low pass filter in particular implementations, the output 50 of the first filter 48 contains only half of the original bandwidth of the input 42, the upper half. After passing through second filter 52, the output 54 of the second filter 52 also contains only half of the original bandwidth of the input 42, the lower half. Outputs 50 and 54 are subsequently received by interleaver 56, which interleaves the two outputs 50, 54 to create interleaved stage output signal 58.

Figure 4:
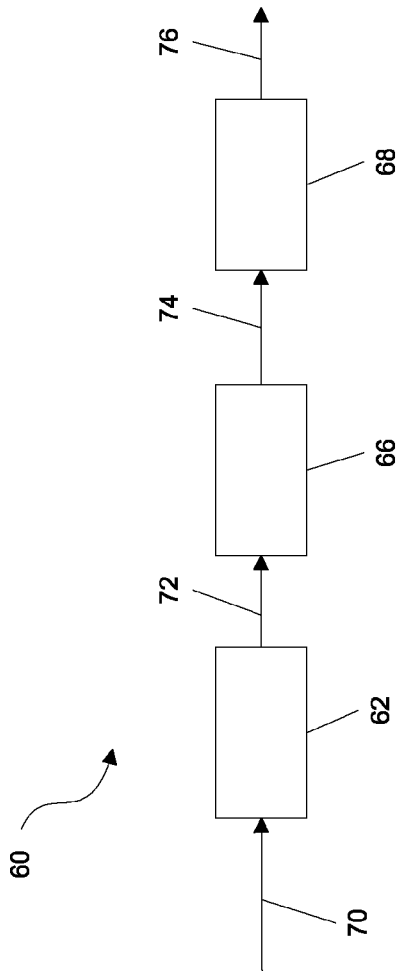
FIG. 4 is a block diagram of a first implementation of a channelizer.

Referring to FIG. 4, a first implementation of a channelizer 60 is illustrated. The channelizer 60 includes one or more stages 62, 66, and 68 coupled together. Each of the stages has the structure of the stage implementation illustrated in FIG. 3. Stage 62 receives input 70 and generates interleaved stage output signal 72, which contains two signals, each with half of the bandwidth of the input 70. A deinterleaver (not shown) is used as part of stage 66, which receives the interleaved stage output signal 72 and generates interleaved stage output signal 74, which now contains four signals, each with one quarter the bandwidth of the input 70. Stage 68 receives interleaved stage output signal 74 and generates channelizer output signal 76, which is an interleaved signal containing eight signals, each with one eighth of the bandwidth of the input 70. By using interleaving, the process of separating 8 channels included in the input 70 is accomplished in three successive stages. In contrast, a more conventional approach that does not use interleaving, but rather relies exclusively on successive division, would require seven stages, and would result in eight separate stage output signals. An effect of utilizing interleaving is that the output signal from any stage will have twice the sample rate of the input stage. The structure of the stage 40 and channelizer 60 implementations illustrated in FIGS. 3 and 4 are like those disclosed in U.S. Pat. No. 6,907,083 (the '083 patent) to John Lillington entitled "Frequency Analysis," issued Jun. 14, 2005, the disclosure of which is hereby incorporated entirely herein by reference.

Referring to FIG. 5, a second implementation of a channelizer stage 78 is illustrated. As illustrated, the stage 78 includes a frequency upconverter 80 and frequency downconverter 82 coupled to a first filter 84 and a second filter 86. The output 88 of the first filter 84, however, is downsampled by a first downsampler 92 coupled to the first filter 84. Correspondingly, the output 90 of the second filter 86 is downsampled by second downsampler 94. The outputs of the first downsampler 92 and the second downsampler 94 are received by interleaver 96 and interleaved to form interleaved stage output signal 98. Because in particular implementations the downsampling may be by a factor of two (which can occur without any data loss if done properly), the sample rate of the interleaved stage output signal 98 may be the same as the sample rate of an input 100 to the stage 78.

Referring to FIG. 6, a second implementation of a channelizer 102 is illustrated that includes three stages 104, 106, 108 like the implementation illustrated in FIG. 5. Because of the use of downsampling, the sample rate of the various stage output signals 110, 112, and the channelizer output signal 114 may be the same as the sample rate of the input signal 116 to the channelizer 102. Implementations of stages and channelizers like those illustrated in FIGS. 5 and 6 are like those disclosed in the '083 patent previously incorporated by reference.

Figure 7:
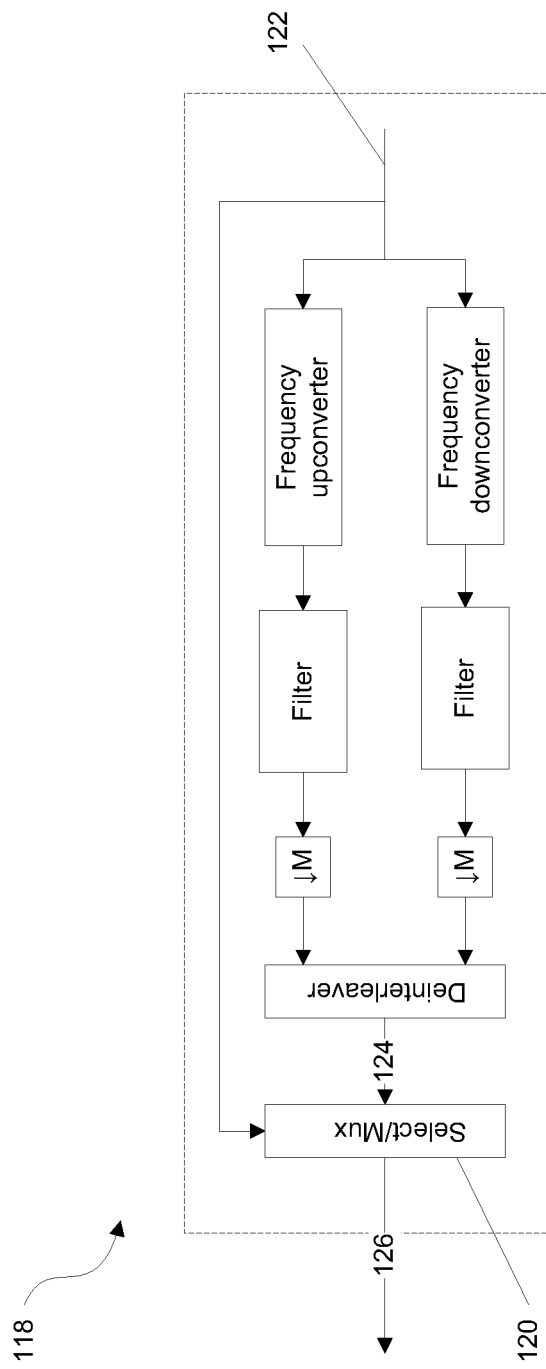
FIG. 7 is a block diagram of a third implementation of a channelizer stage.

Referring to FIG. 7, a third implementation of a channelizer stage 118 is illustrated. Like the previously discussed stage implementations 40 and 78, the channelizer stage 118 includes a frequency upconverter, frequency downconverter, a pair of filters, a pair of down samplers and a deinterleaver. The stage 118 also includes a selector multiplexer 120 coupled to the input 122 to the stage 118 and to the output 124 from the deinterleaver. The selector multiplexer 120 allows for the inclusion of data either from the output 124 from the deinterleaver or from the input 122. In particular implementations, control information may be included in the input 122 which serve to enable the selector multiplexer 120 to select which of the output 124 from the deinterleaver or the input 122 to include in a channelizer output signal 126. Because a signal from the input 122 can be included in the channelizer output signal 126, the control information can be used to enable "bypassing" of a stage by particular channels. In various implementations, the channels may not all have the same bandwidth; for example, the input 122 may include two channels of equal bandwidth and a third channel that has twice the bandwidth of either of the two channels. Because the third channel does not have the same bandwidth as the other channels, were it to be processed through the channelizer stage without bypassing, the channel data would be lost. By using control data to govern the operation of the selector multiplexer 120, the third channel can be passed into the channelizer output signal 126 and interleaved with the two channels of equal bandwidth, which have been separated by passing through the stage 118. The foregoing principle can be used to allow channels of any width that is a power of two of the smallest channel size to bypass a particular stage.

Figure 8:
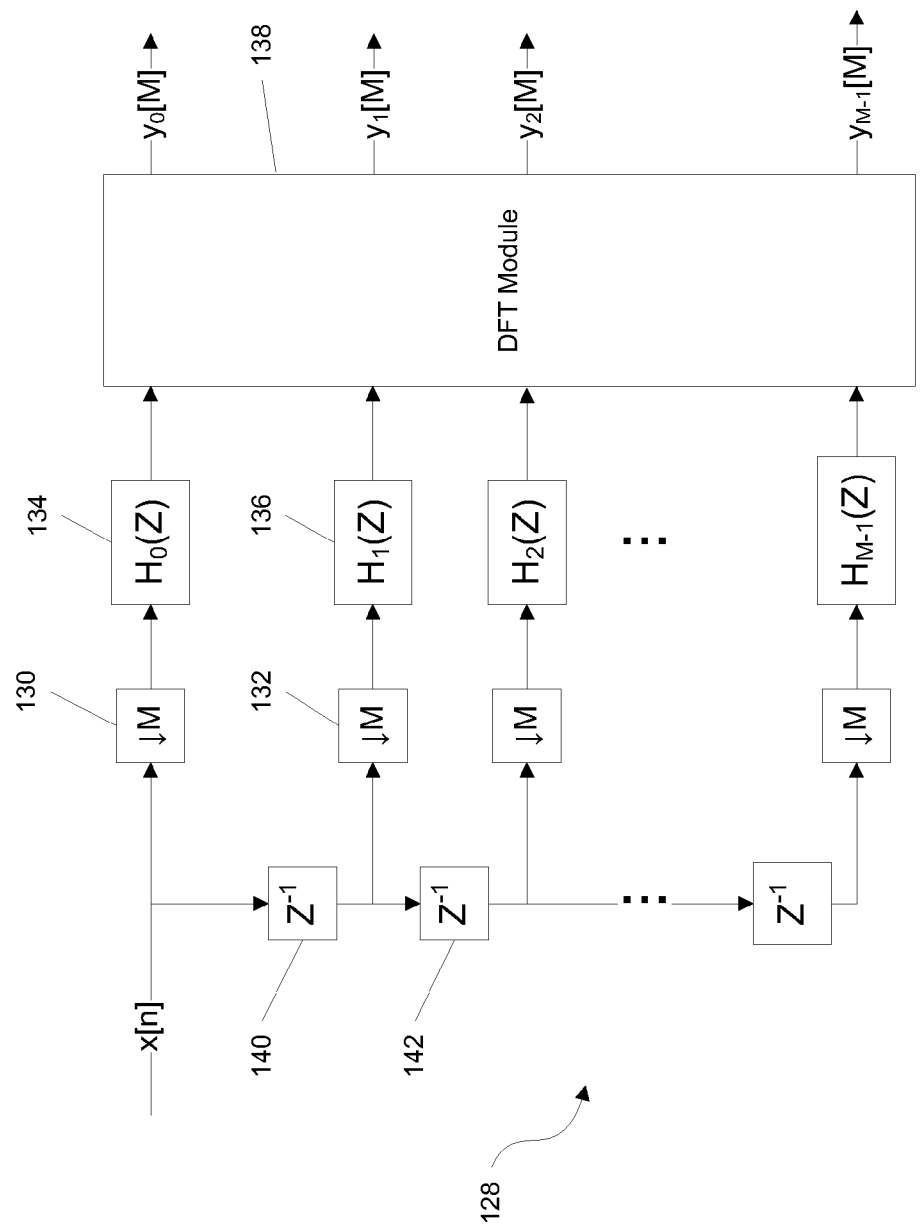
FIG. 8 is a block diagram of a third implementation of a channelizer.

Referring to FIG. 8, a third implementation of a channelizer 128 is illustrated. The channelizer 128 shown is a block diagram view of a polyphase filter bank. In the channelizer 128, each stage includes a downsampler 130, 132 coupled with a bandpass filter 134, 136 coupled to discrete Fourier transform (DFT) module 138. Index markers 140, 142 assist in the separation of the various channels in wideband signal x[n] into various narrowband signals y[n] as individual channels. Because the bandpass filters 134, 136 pass only the bandwidth of the wide band signal x[n] that corresponds with a particular individual channel, the channelizer 128 has as many stages as there are channels to be separated, and has as many outputs as channels that are separated. Additional teachings regarding the structure, operation, and use of polyphase filter banks as channelizers may be found in the paper by Fredric J. Harris et al. entitled "Digital Receivers and Transmitters Using Polyphase Filter Banks for Wireless Communications," *IEEE Transactions on Microwave Theory and Techniques*, p. 1395-1412, Vol. 51, No. 4 (April 2003), the disclosure of which is hereby incorporated entirely herein by reference.

Figure 9:
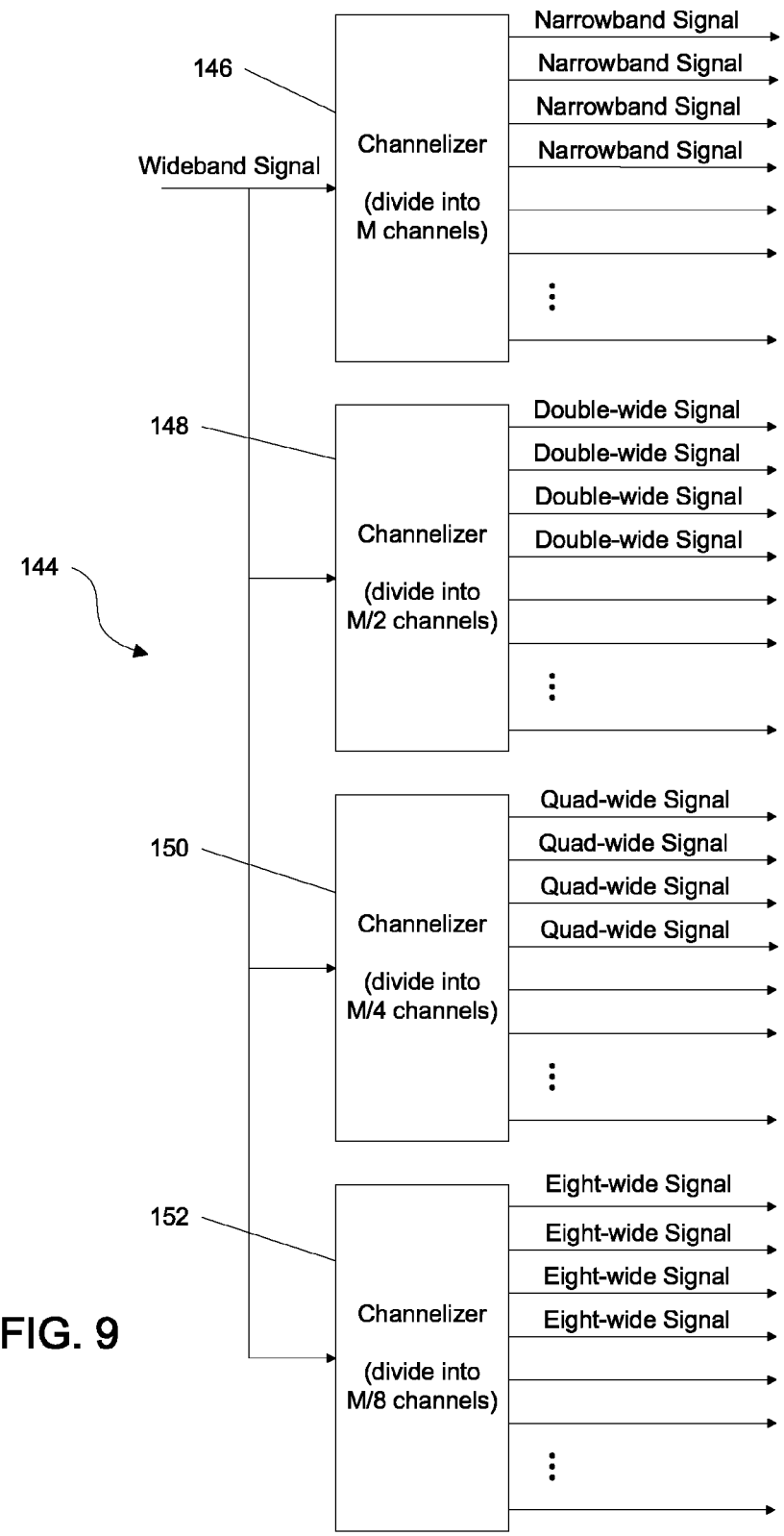
FIG. 9 is a block diagram of a fourth implementation of a channelizer.

Referring to FIG. 9, a fourth implementation of a channelizer 144 is illustrated. As illustrated, the channelizer 144 contains four polyphase filter banks 146, 148, 150, 152 that each may have a structure like the implementation illustrated in FIG. 8. As illustrated, a wideband signal enters the channelizer 144, and based on control information contained in or accompanying the wideband signal, a particular polyphase filter bank 146, 148, 150, or 152 is selected to process the wideband signal into a plurality of narrowband signals. If polyphase filter bank 146 is selected, then the wideband signal will be separated a plurality of narrowband signals, each as wide as a single channel, because the bandpass filters in polyphase filter bank 146 are designed to pass only one channel per stage. If polyphase filter bank 148 is selected, then the wideband signal will be separated into a plurality of double-wide signals because the bandpass filters in polyphase filter bank 148 are designed to pass two channels per stage. In other words, the bandpass filters of polyphase filter bank 146 are designed to pass a first number of channels per stage (one channel per stage) and the bandpass filters of polyphase filter bank 148 are designed to pass a second number of channels per stage (two channels per stage) where the second number is different than the first number. Implementations of channelizers 144 may be used to allow for the processing of variously wide channels, including channels that have unequal widths, where a logic circuit, such as, by non-limiting example, a commutator, state machine, or other switching device is used to ensure that only certain portions of the wideband signal are processed by particular polyphase filters banks 146, 148, 150, 152 that correspond with the channel size in the certain portions.

In other implementations, the wideband signal may be processed simultaneously by all of the polyphase filter banks 146, 148, 150, and 152 and a logic circuit like those previously disclosed may be used to select from the outputs of the various polyphase filter banks the ones that correspond to the actual channel widths contained in the wide band signal. For example, if the wideband signal contains an eight-wide, quad-wide, and four narrowband (single-wide) signals, then the logic circuit would select the four outputs from polyphase filter bank 146 that correspond with the four narrowband signals (either the upper four outputs or lowest four outputs of polyphase filter bank 146, because of the constraint of this design that N-wide channels are on N-channel boundaries, or in other words, that the number of channels in each half of the bandwidth of the wideband signal is divisible by two). The second from the top or second from the bottom output of polyphase filter bank 150 would then be selected, depending upon the position of the quad-wide signal, and the second from the top or second from the bottom output of polyphase filter bank 152 would be selected, depending upon the position of the eight-wide signal in the bandwidth of the wideband signal. In this way, the desired channels can be retrieved from the bandwidth of the wideband signal.

Figure 10:
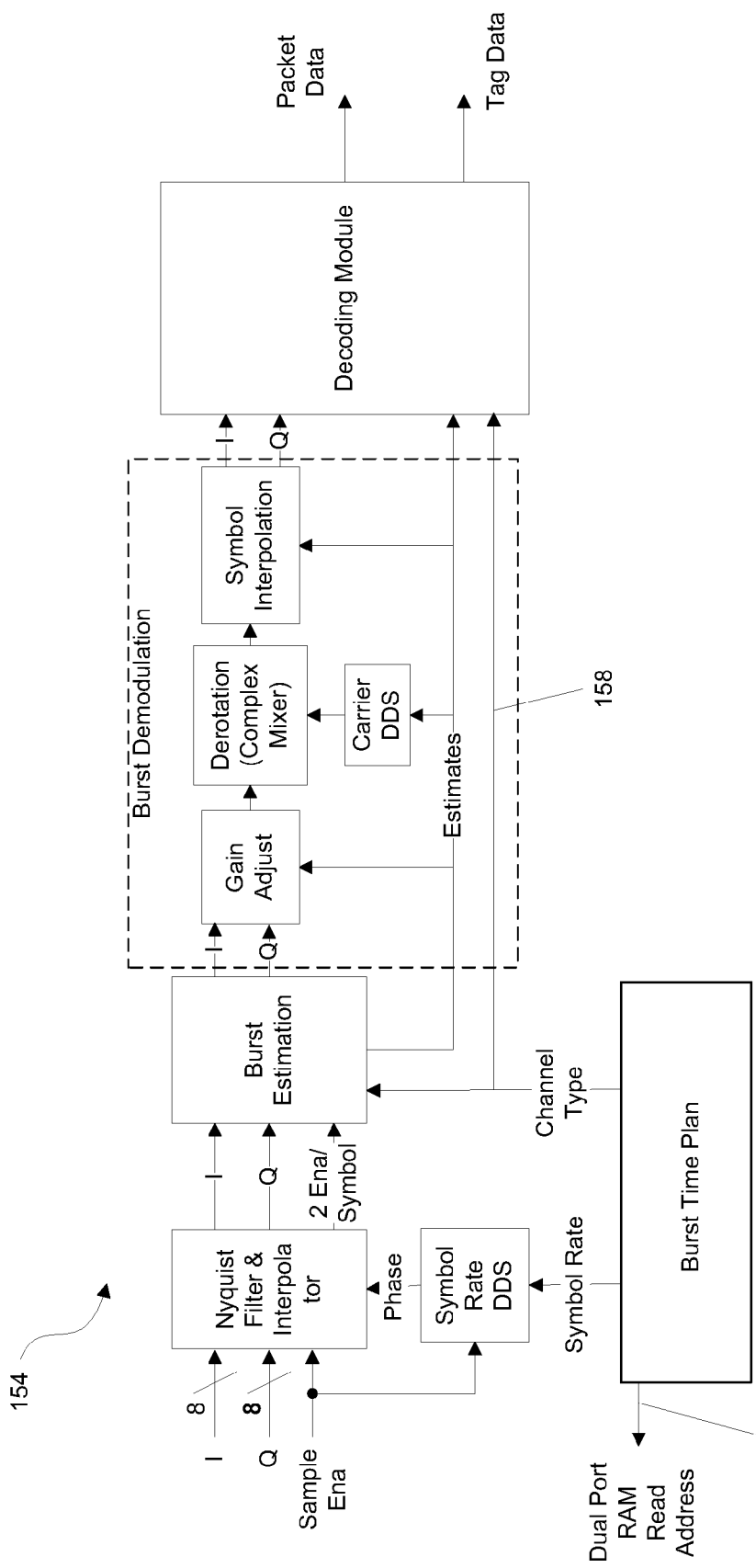
FIG. 10 is a block diagram of an implementation of a demodulator.

Referring to FIG. 10, an implementation of a demodulator 154 that may be used in particular implementations of burst processing modems disclosed in this document. Here, because the demodulator 154 operates to demodulate a burst, rather than a continuous stream of information, the components of the demodulator 154 are designed to be able to rapidly acquire the burst and demodulate it into a quantity of packet data that will be sent to a decoding module for decoding. As illustrated, the burst time plan (as utilized by the frame state machine) is used to develop a set of dual port RAM read address values in a timing signal 156 that are used to retrieve the bursts to be processed by the demodulator 154. The demodulator 154 implementation illustrated in FIG. 10 includes a feedback loop 158 and is designed to process bursts that contain a conventional burst structure that includes a carrier acquisition portion followed by a unique word. Other types and components may be contained in various demodulator implementations depending upon the structure of the burst that needs to be demodulated. An example of another demodulator type that can be used to demodulate bursts in various implementations of burst processing modems like those disclosed in this document as well as the structure of a burst that may be used with such implementations may be found in copending U.S. patent application Ser. No. 12/553, 045 to Eymann, et al., entitled "Burst Demodulator," filed Sep. 2, 2009, the disclosure of which is hereby incorporated entirely herein by reference.

Figure 11:
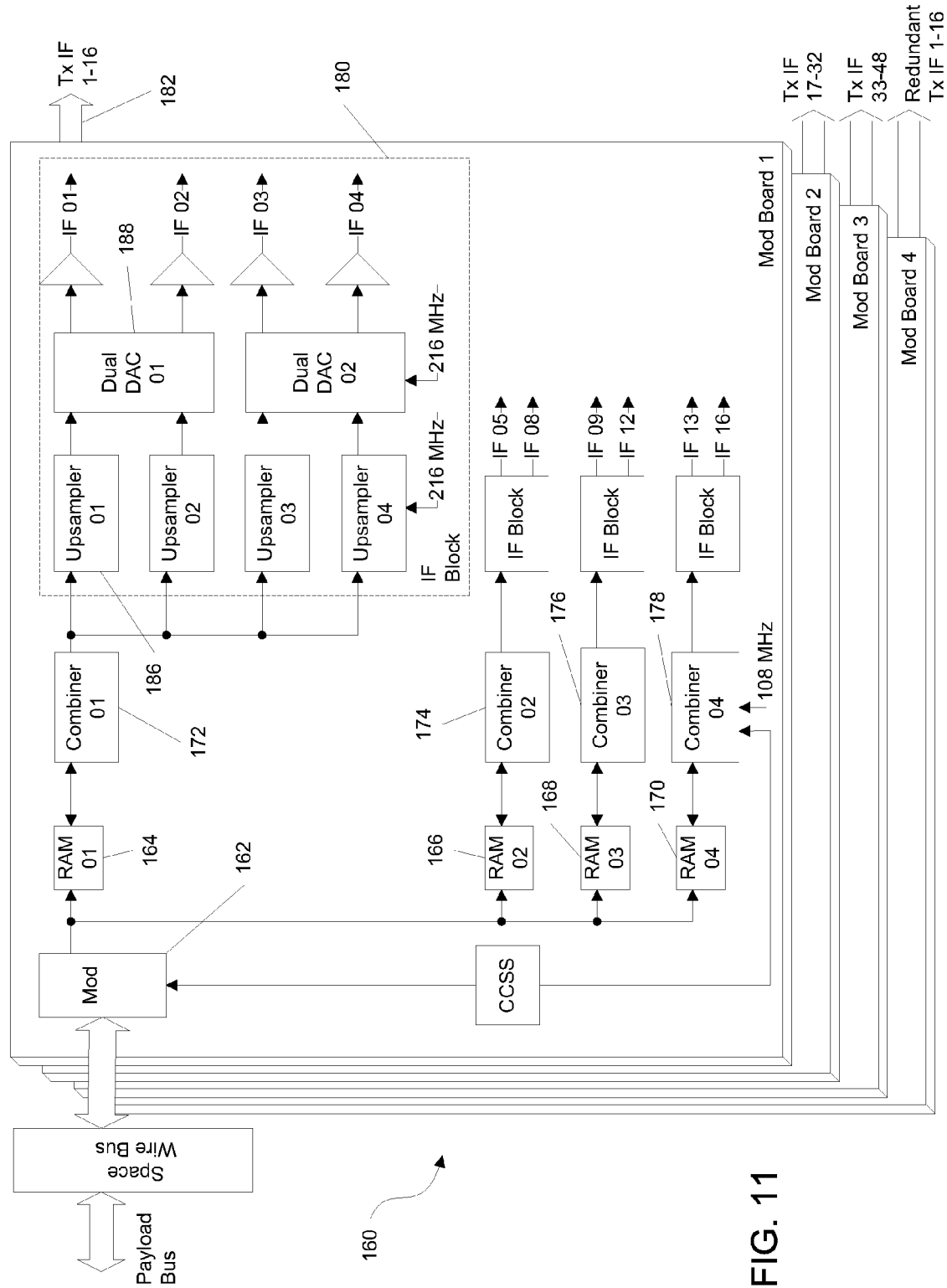
FIG. 11 is a detail block view of a portion of the transmit side of the burst processing modem implementation illustrated in FIG. 1.

Referring to FIG. 11, a detail view of a portion 160 of the transmit side 14 of the burst processing modem 2 implementation illustrated in FIG. 1 is shown. As illustrated, a modulator 162 (which may be a single modulator in particular implementations) is coupled to RAM arrays 164, 166, 168, 170 which are coupled to combiners 172, 174, 176, and 178, respectively. While in the implementation of the portion 160 illustrated in FIG. 11 four RAM arrays and four combiners are utilized, two or more RAM arrays and two or more combiners (combiner banks) or fewer may be utilized in various implementations. Each combiner 172, 174, 176, and 178 is coupled with an IF block 180 that serves to process and digitize a modulated plurality of channels created by each combiner 172, 174, 176, and 178 for each of the plurality of beams to be transmitted (or for transmission) 182. As with the demodulator implementations disclosed in this document, the RAM arrays may be dual port RAM arrays. Referring to FIG. 1, a transmit frame state machine 184 is coupled with the combiners, the RAM arrays and, in particular implementations, with the modulator 162. The transmit frame state machine 184 functions analogously to the receive frame state machine 30 in that it utilizes the burst time plan to generate a timing signal that permits the combiner 172 to assemble the bursts in the proper time order within each frame of a plurality of frames associated with a particular one of a plurality of modulated channels stored in the RAM array 164. The plurality of modulated channels are created from data included in a plurality of data packets received from packet traffic processing module 16, which are modulated and which may, in particular implementations, be written at a high rate into the RAM arrays to enable them to be upsampled by upsampler 186 and sampled by digital-to-analog converter (DAC) 188 (which may have a higher sample rate than the ADC 24 due to sin(x)/x considerations and may operate on two beams at once). In the implementation illustrated in FIG. 11, sixteen beams may be produced by the operation of a single modulator with four combiners and four RAM arrays.

Figure 12:
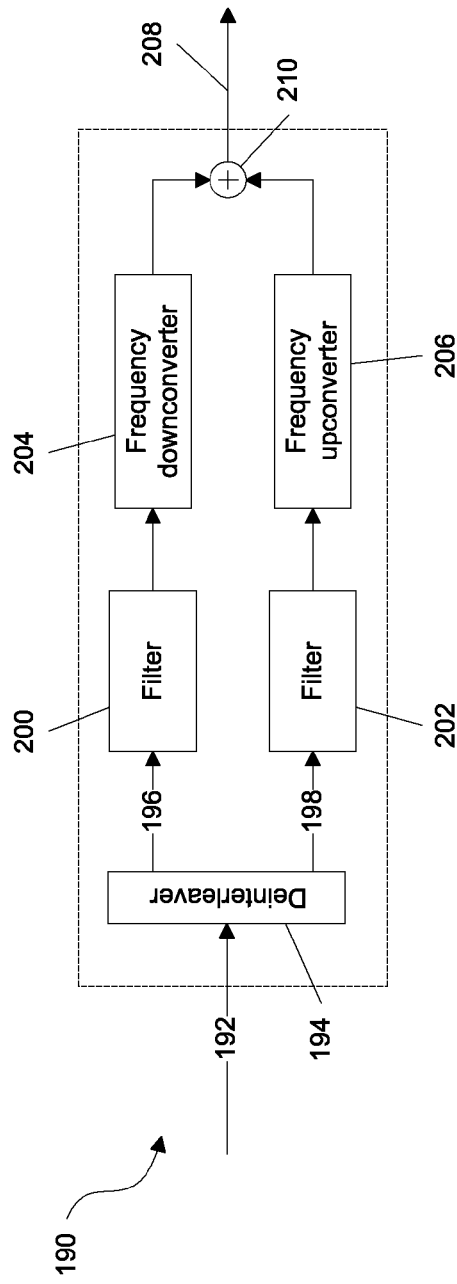
FIG. 12 is a block diagram of a first implementation of a combiner stage.

Combiners 172, 174, 176, and 178 may include various structures depending upon the desired operation of the burst processing modem implementation. Referring to FIG. 12, a first implementation of a combiner stage 190 is illustrated. Interleaved input 192 containing two or more channels is received by deinterleaver 194 which produces a first channel signal 196 and a second channel signal 198. The first channel signal 196 is filtered by a first filter 200 and processed by a frequency downconverter 204, which places the bandwidth of the first channel signal 196 in the lower portion of the bandwidth of a stage output signal 208. The second channel signal 198 is filtered by a second filter 202 and processed by a frequency upconverter 206 to place the bandwidth of the second channel signal 198 in an upper portion of the bandwidth of the stage output signal 208. Adder 210 adds the outputs of the frequency upconverter and frequency downconverter to form stage output signal 208 (combined output), with the first channel signal 196 and second channel signal 198 included in the stage output signal 208 which has twice the bandwidth of the interleaved input 192 and half its sample rate.

Figure 13:
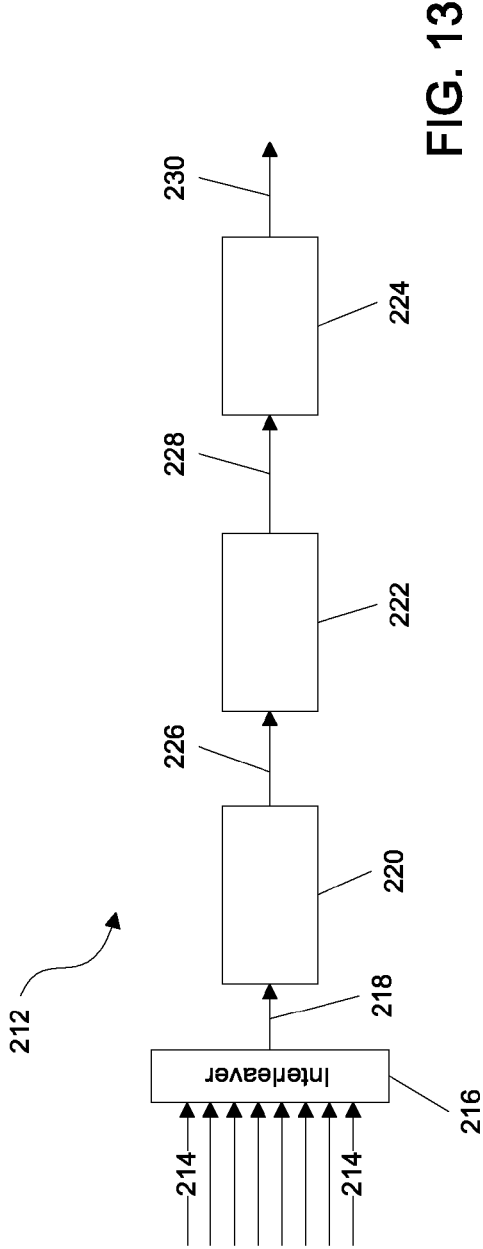
FIG. 13 is a block diagram of a first implementation of a combiner (combiner bank)

Referring to FIG. 13, a block diagram of a first implementation of a combiner 212 is illustrated. As illustrated, a plurality of input channels 214 are received by interleaver 216 which interleaves them to form interleaved input 218 to stage 220 that contains all of the data from the input channels. Stage 220 combines half of the channels to form interleaved output 226, stage 222 combines half of the channels in output 226 to form output 228, and stage 224 completes the combination of the remaining channels in output 228 to form non-interleaved combiner output signal 230, which is a wideband signal with a bandwidth equal to the sum of bandwidths of the plurality of input channels 214 and with a sample rate equal to one eighth of the sample rate of each individual input channel 214.

Additional disclosure regarding the structure, use, and operation of implementations of combiner stages and combiners discussed above and illustrated in FIGS. 12 and 13 may be found in copending U.S. patent application Ser. No. 12/552,576 (the '576 application) to John Crockett entitled "Combiner System and Related Methods," filed Sep. 2, 2009, the disclosure of which is hereby incorporated entirely herein by reference.

Figure 14:
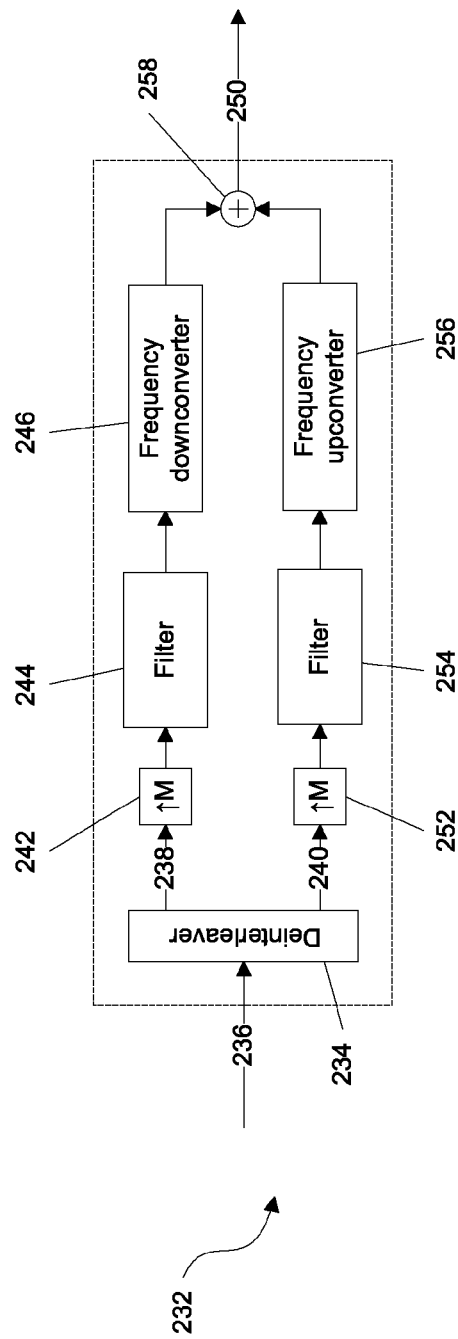
FIG. 14 is a block diagram of a second implementation of a combiner stage.

Referring to FIG. 14, a block diagram of a second implementation of a combiner stage 232 is illustrated. Like the combiner stage implementation illustrated in FIG. 12, the stage 232 includes a deinterleaver 234 that deinterleaves interleaved input signal 236 to form a first channel signal 238 and a second channel signal 240. First channel signal 238 is upsampled by upsampler 242 to twice its sample rate (which can be accomplished without losing or corrupting the data in the first channel signal 238) and then filtered by filter 244 and frequency downconverted by frequency downconverter 246 to place the bandwidth of the first channel signal 238 in a lower portion of the bandwidth of a stage output signal 250. Similarly, second channel signal 240 is upsampled by upsampler 252, filtered by filter 254, and frequency upconverter 256 to place the bandwidth of the second channel signal 240 in the upper portion of the bandwidth of the stage output signal 250. Adder 258 adds the outputs of the frequency downconverter 246 and frequency upconverter 256 to form the stage output signal 250 that has twice the bandwidth of the interleaved input signal 236 and the same sample rate, due to the upsampling of the signals.

Figure 15:
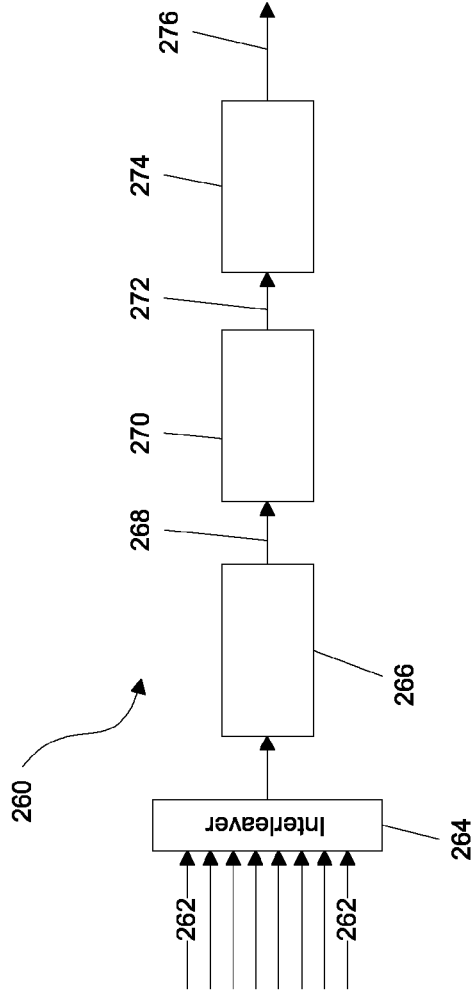
FIG. 15 is a block diagram of a second implementation of a combiner.

Referring to FIG. 15, a block diagram of an implementation of a second implementation of a combiner 260 is illustrated. As illustrated, a plurality of input channels 262 are received by interleaver 264, interleaved, and processed by stage 266 (an implementation like those illustrated in FIG. 14), which produces interleaved output 268 that has half of the input channels 262 combined. Stage 270 takes interleaved output 268 and combines half of the input channels 262 again to produce interleaved output 272. Stage 274 takes interleaved output 272 and completes the combination of the channels to produce non-interleaved combiner output 276, which has a bandwidth equal to the combined bandwidth of each of the input channels 262 and a sample rate identical to that of the input channels 262. Additional disclosure regarding the structure and teachings of second implementations of combiner stages and second implementations of combiners may be found in the '576 application, previously incorporated by reference.

Figure 16:
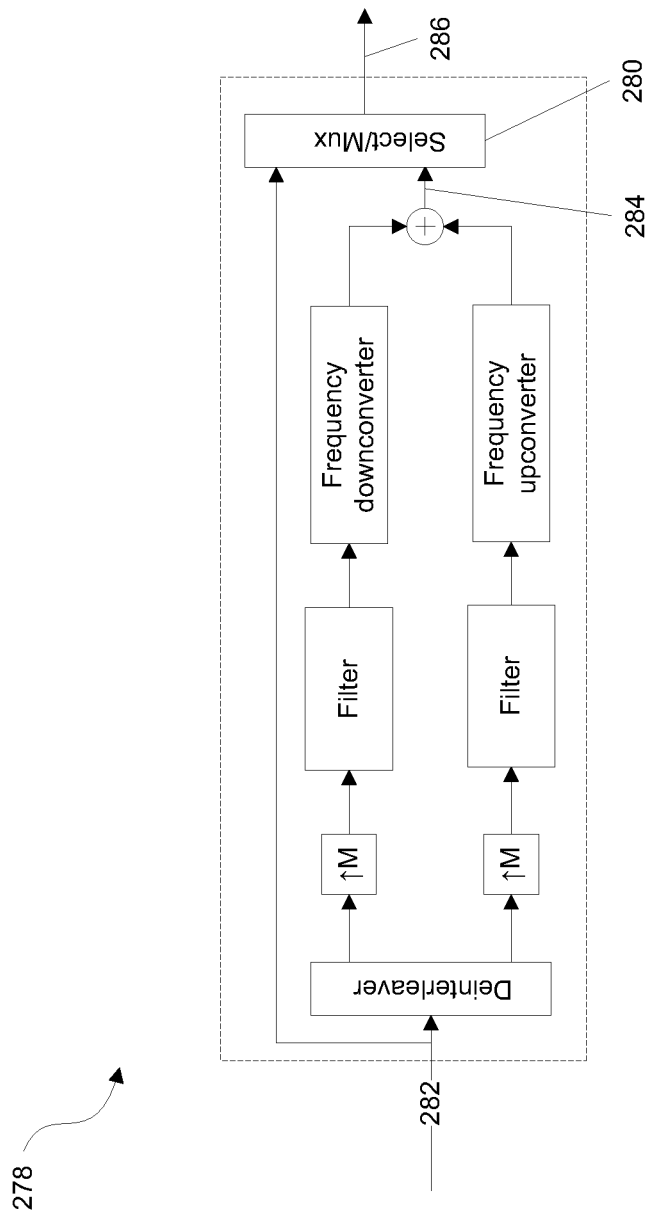
FIG. 16 is a block diagram of a third implementation of a combiner stage.

Referring to FIG. 16, a block diagram of a third implementation of a combiner stage 278 is illustrated. As illustrated, the stage 278 contains the components of the stage implementation illustrated in FIG. 14, but adds a selector multiplexer 280 that is coupled to the interleaved input 282 and to output 284. In response to control instructions included in interleaved input 282, the selector multiplexer 280 includes either a copy of the interleaved input 282 or the output 284 in a stage output 286. Because of the use of the selector multiplexer 280, channels of different bandwidths may be combined by allowing wider channels to "bypass" a particular combiner stage. An extensive discussion regarding the combination of variously sized channels and bypassing may be found in the '576 application, as well as additional disclosure regarding the use and structure of third implementations of combiner stages 278.

Figure 17:
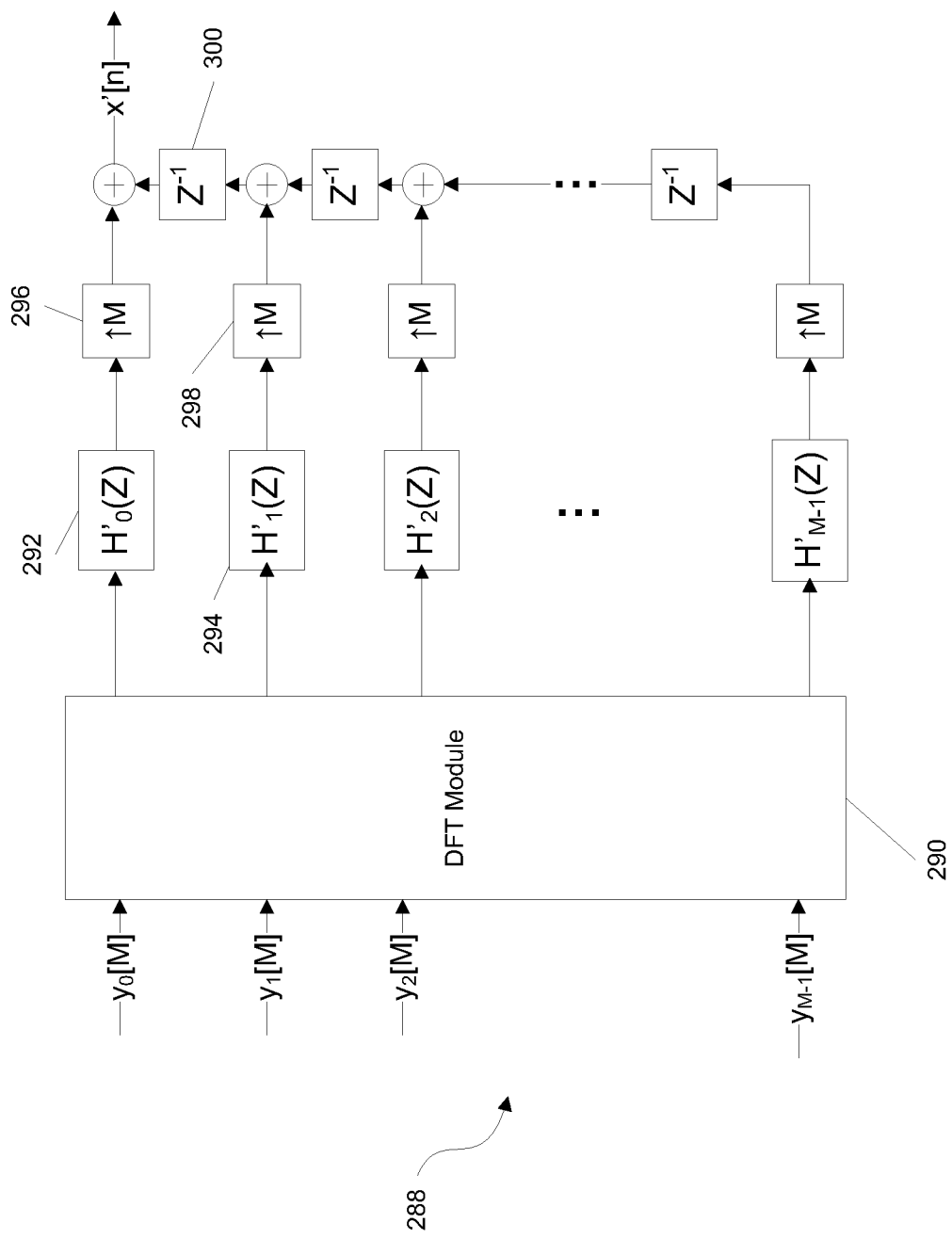
FIG. 17 is a block diagram of a third implementation of a combiner.

Referring to FIG. 17, a block diagram of a third implementation of a combiner (combiner bank) 288 is illustrated. As illustrated, the combiner 288 is a polyphase filter bank that includes a discrete Fourier transform (DFT) module 290 coupled to bandpass filters 292, 294 which are coupled to upsamplers 296, 298, respectively. Each of the respective combinations of bandpass filter and upsampler form a stage in the combiner 288. The outputs of the upsamplers 296, 298 are added and index marker 300 is used to ensure that the addition creates a wideband signal x'[n] that has the combined bandwidth of the various narrow band signals y[n]. Additional disclosure regarding the structure and operation of polyphase filter banks utilized for combining may be found in the paper written by Harris et al. previously incorporated by reference.

Figure 18:
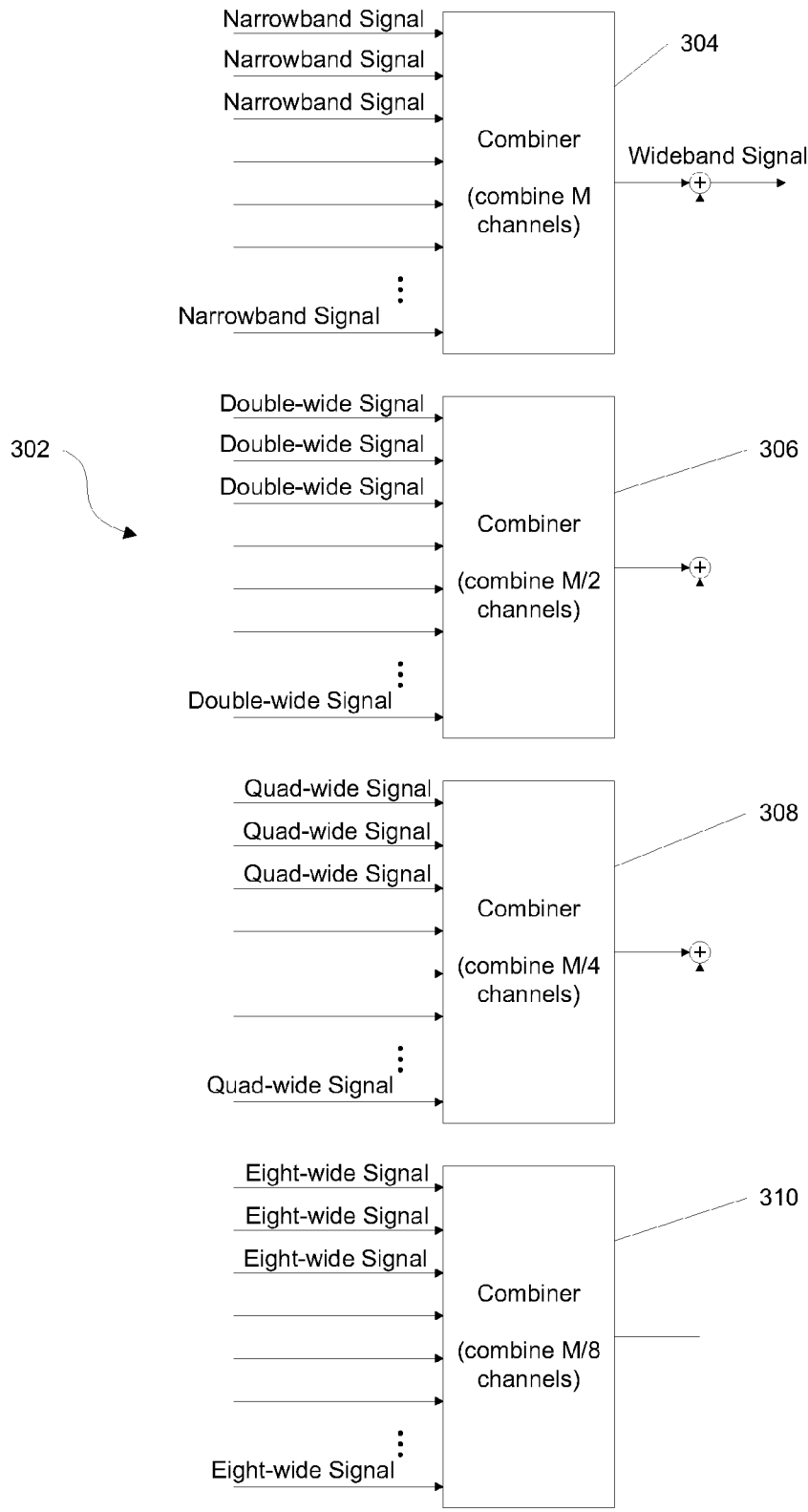
FIG. 18 is a block diagram of a fourth implementation of a combiner.

Referring to FIG. 18, a block diagram of a fourth implementation of a combiner 302 is illustrated. As illustrated, the combiner 302 includes a plurality of polyphase filter banks, 304, 306, 308, 310 each of which may be configured like those illustrated in FIG. 17. Implementations of combiners 302 may be used to combine channels of varying bandwidths by allowing for the processing and summing of a narrow band signal (combiner 304) with a double-wide signal (via combiner 306), a quad-wide signal (via combiner 308), or an eight-wide signal (via combiner 310). Because the outputs of the combiners 304, 306, 308, and 310 are summed, a wideband signal that has the bandwidth of all of the added signals is formed. The ability of the combiner 306 to handle double-wide signals is because the bandpass filters within the combiner 306 are configured to pass a bandwidth equal to twice that of the individual narrowband signals handed by combiner 304. In other words, the bandpass filters of combiner 306 are configured to pass a first number of channels through the filters and the bandpass filters of combiner 304 are configured to pass a second number of channels, where the first number is different from the second number. A control logic circuit like those previously discussed may be utilized to ensure that the output of each of the combiners 304, 306, 308, and 310 is placed in a proper position in the bandwidth of the wideband signal to ensure that it can be retrieved (i.e., follows the previously described constraints on the location of channels within the bandwidth of a received wideband signal or beam).

Implementations of burst processing modems like those disclosed in this document may allow for significant reduction in the number of modems needed to process the various channels of the beams a satellite is capable of utilizing. As a non-limiting example, the implementation illustrated in FIG. 1 is capable of handling 48 operational beams with 16 redundant beams available. In the implementation illustrated, 240 channels are available per beam, which means that the implementation in FIG. 1 is capable of processing 15,360 independent frequency channels with four modems. In contrast, conventional modems designed to handle a single channel would require the use of 15,360 modems to perform the equivalent work of the 4 modems like those illustrated in FIG. 1. This result is a consequence of the structure of the modems disclosed herein.

In places where the description above refers to particular implementations of burst processing modems, it should be readily apparent that a number of modifications may be made without departing from the spirit thereof and that these implementations may be applied to other burst processing modems.

The invention claimed is:

1. A method for burst processing using a modem, the method comprising:
   processing a plurality of channels from among a plurality of intermediate frequency (IF) received beams using a channelizer;
   writing a plurality of frames from among the plurality of channels to a RAM array using the channelizer, each of the plurality of frames comprising one or more bursts;
   generating a timing signal using a burst time plan for the plurality of frames by a receive frame state machine;
   reading from the RAM array only the one or more bursts from the plurality of frames indicated by the timing signal, using a demodulator; and
   demodulating and transmitting the one or more bursts to a decoding module using the demodulator.

2. The method of claim 1, further comprising:
   receiving and filtering the plurality of IF received beam signals using an IF block; and
   converting the filtered plurality of IF received beam signals to a plurality of channels using an analog-to-digital converter (ADC).

3. The method of claim 1, further comprising demodulating, using a single demodulator, the one or more bursts from the plurality of frames included in each of the plurality of channels wherein the plurality of channels is from any of sixteen IF received beams.

4. The method of claim 1, wherein the channelizer further comprises one or more stages each comprising a frequency upconverter coupled with a first filter and an interleaver and a frequency downconverter coupled with a second filter and with the interleaver.

5. The method of claim 4, wherein each of the one or more stages further comprises a first downsampler coupled with the first filter and with the interleaver and a second downsampler coupled with the second filter and with the interleaver.

6. The method claim 5, further comprising outputting, by a selector multiplexer, an output of the interleaver or a copy of the input to the frequency upconverter and to the frequency downconverter in response to a control signal in the input to the frequency upconverter and to the frequency downconverter.

7. The method of claim 1, further comprising separating a channel of the plurality of channels from one of the plurality of received IF beams and writing the channel to the RAM array using a polyphase filter bank.

8. The method of claim 7, further comprising passing a first number of channels per stage using one or more bandpass filters in a first polyphase filter bank and second number of channels per stage using one or more bandpass filters in a second polyphase filter bank, the first number being different than the second number.

9. A method for burst processing using a modem, the method comprising:
   modulating a plurality of channels of a plurality of beams using a single modulator;
   writing to a first RAM array, a first portion of the modulated plurality of channels and writing to a second RAM array, a second portion of the modulated plurality of channels using the modulator;
   reading, by a first combiner bank, the first portion of the of the modulated plurality of channels from the first RAM array and assembling a first plurality of frames each including one or more bursts using a timing signal generated form a burst time plan by a transmit frame state machine; and
   reading, by a second combiner bank, the second portion of the modulated plurality of channels from the second RAM array and assembling a second plurality of frames each including one or more bursts using a timing signal generated from the burst time plan by the transmit frame state machine.

10. The method of claim 9, further comprising:
    upsampling the first plurality of frames and the second plurality of frames to produce an upsampled first plurality of frames and an upsampled second plurality of frames using a plurality of upsamplers; and
    receiving the upsampled first plurality of frames and the upsampled second plurality of frames to produce the plurality of channels for each of the plurality of beams using two or more digital-to-analog converters (DAC) of an intermediate frequency (IF) block.

11. The method of claim 9, further comprising producing a plurality of channels for sixteen beams using four combiner banks and four RAM arrays by modulating four pluralities of frames.

12. The method of claim 9, further comprising adding a filtered and deinterleaved output of a frequency downconverter and a filtered and deinterleaved output of a frequency upconverter to form a combined output by the first and second combiner banks.

13. The method of claim 12, wherein a first upsampler is coupled to a deinterleaver and to a first filter and a second upsampler is coupled to the deinterleaver and to a second filter.

14. The method of claim 13, further comprising outputting the combined output or a copy of an input to the deinterleaver in response to a control signal in the input to the deinterleaver using a selector multiplexer.

15. The method of claim 9, further comprising adding an output of each of a plurality of upsamplers to form a digital beam signal for transmission.

16. The method of claim 15, further comprising passing a first number of channels using one or more bandpass filters in the first combiner bank and second number of channels using one or more bandpass filters in the second combiner bank, the first number being different than the second number.

17. A method for burst processing using a modem, the method comprising:

receiving and filtering a plurality of IF beam signals to form a plurality of channels for each of the plurality of IF beam signals using a receive intermediate frequency (IF) processing array;

processing the plurality of channels and writing a plurality of frames included in each of the plurality of channels to a receive random access memory (RAM) array using a channelizer, each of the plurality of frames comprising one or more bursts;

generating a timing signal using a burst time plan for the plurality of frames of each of the plurality of channels using a receive frame state machine;

reading from the receive RAM array only the one or more bursts from the plurality of frames indicated by a timing signal and demodulating the one or more bursts using a demodulator;

receiving the demodulated one or more bursts and decoding the demodulated one or more bursts to produce a plurality of packet data using a decoding module;

encoding a quantity of packet data using an encoder;

modulating the encoded quantity of packet data into a modulated plurality of channels of a plurality of beams for transmission and writing the modulated plurality of channels to a transmit RAM array using a modulator;

reading the modulated plurality of channels from the transmit RAM array and assembling a plurality of frames using a combiner bank, each frame including one or more bursts using a timing signal generated from a burst time plan by a transmit frame state machine; and receiving and converting the plurality of frames to a plurality of IF beam signals using a transmit IF array.

18. The method of claim 17, wherein the receive RAM array and the transmit RAM array are a same physical RAM array.

19. The method of claim 17, wherein the channelizer comprises one or more stages, wherein each stage comprises a frequency upconverter coupled with a first filter and with an interleaver and a frequency downconverter coupled with a second filter and with the interleaver.

20. The method of claim 19, further comprising separating a channel of the plurality of channels from one of the plurality of received IF beams and writing the channel to the RAM array using a polyphase filter bank.

21. The method of claim 19, further comprising adding an output of the frequency downconverter and an output of the frequency upconverter to form a combined output.

22. The method of claim 17, further comprising adding an output of each of a plurality of upsamplers to form a digital beam signal for transmission.

* * * * *